United States Patent [19]
Gabby et al.

[11] 3,800,036
[45] Mar. 26, 1974

[54] ICE MILK OR LOW FAT IMITATION ICE CREAM

[75] Inventors: John Lester Gabby; Dennis Dale Corbin; Jack Bruner Lowe, all of Evansville, Ind.

[73] Assignee: The Drackett Company, Cincinnati, Ohio

[22] Filed: Jan. 10, 1972

[21] Appl. No.: 216,809

Related U.S. Application Data

[63] Continuation-in-part of Ser. No. 153,837, June 16, 1971, which is a continuation-in-part of Ser. No. 74,211, Sept. 21, 1970, abandoned.

[52] U.S. Cl. ............................................. 426/164
[51] Int. Cl. ............................................. A23g 5/00
[58] Field of Search ........................................ 99/136

[56] References Cited
UNITED STATES PATENTS

| | | | |
|---|---|---|---|
| 3,510,316 | 5/1970 | Decker | 99/136 |
| 3,637,774 | 1/1972 | Babarjan et al. | 99/136 |
| 3,628,968 | 12/1971 | Noznick et al. | 99/136 |
| 3,003,882 | 10/1961 | Peat | 99/136 |
| 3,215,532 | 11/1965 | Bassett | 99/136 |
| 3,183,098 | 5/1965 | Baur | 99/136 |

*Primary Examiner*—A. Louis Monacell
*Assistant Examiner*—J. M. Hunter
*Attorney, Agent, or Firm*—Robert E. Carnahan; Robert H. Uloth

[57] ABSTRACT

Frozen desserts including ice milk and imitation ice cream having no triglyceride fat ingredient or optionally up to 7 percent by weight of fat can be prepared by employing as texturizing ingredient 0.5 to 1.5 percent by weight of a polyglycerol ester. From 0.05 to 0.5 percent by weight of a hydrophilic colloid stabilizer is optionally employed.

12 Claims, No Drawings

ICE MILK OR LOW FAT IMITATION ICE CREAM

CROSS REFERENCE TO RELATED APPLICATION

This application is a continuation-in-part of U.S. Pat. application Ser. No. 153,837 filed June 16, 1971, which in turn is a continuation-in-part of co-pending U.S. Pat. application Ser. No. 74,211 filed Sept. 21, 1970 and now abandoned.

FIELD OF THE INVENTION

This invention involves frozen desserts including ice milk, imitation ice cream of both the soft and hard varieties, and imitation ice cream shakes. In preferred embodiments the products have low fat content and are designed to have the appearance and taste of soft or hard ice cream, an ice cream shake, or ice milk, but to supply substantially reduced food energy than the corresponding ice cream product in like amount.

BACKGROUND OF THE INVENTION

The compositions of the present invention are denominated ice milks or low fat imitation ice creams since some embodiments thereof comply with the standards of identity of regulatory agencies for products of this type with respect to manner of preparation and ingredients and other embodiments have lower fat contents yet resemble those products in organoleptic qualities and appearance. The discovery has been made that ice milks and low fat imitation ice creams of improved gustatory quality may be prepared by employing a polyglycerol fatty ester as texturizing ingredient in an amount constituting but a small portion on a weight basis of the amount of fat replaced or contained in a conventional ice cream or shake of comparable quality.

The polyglycerol esters have been known for many years having been first described in the chemical literature as early as 1930. Edible grades have been widely used in margarine manufacture as anti-spattering ingredients and in the preparation of shortening compositions for use in the preparation of confections and pastries because of their emulsifying qualities. Refer for example to U.S. Pat. No. 3,230,909 and Belgian Pat. No. 636,949 dated June 10, 1965 (Chemical Abstracts, 65, 6204d). They have also been used as emulsifying agents in gelatin desserts and in whipped toppings. Refer to Brunner et al. U.S. Pat. No. 3,592,663 (patented July 13, 1971) and Wyss et al., U.S. Pat. No. 3,579,355 (patented May 18, 1971).

The Brunner et al. patent refers to fluffy frosting compositions intended for use on cakes, candy, ice cream, and as a filling for baked items. They are comprised essentially of sugar, water, and a foaming agent, and are whipped to provide compositions of very low specific gravity, namely less than 0.3. The products depend for their unusual quality as cake frostings upon the hydrophilic/lipophilic character of specific polyglycerol esters having a high proportion of fatty ester groups having 22 carbon atoms or more.

The Wyss et al. patent refers to gelatin dessert compositions which separate into two or three layers on constitution with warm water and cooling to provide an unusual layered gelatin dessert. Neither the Brunner et al. nor the Wyss et al. product contains milk solids or a protein and carbohydrate substitute therefor, but rather they are comprised mainly of sugar, gelatin, and water. The latter depends for layer formation on specific combinations of fat and emulsifiers and employs lesser amounts of polyglycerol ester than are employed in the compositions of the present invention.

The prior art has also dealt with the preparation of imitation ice cream containing milk solids or substitutes therefore and fat, but not through the use of a polyglycerol ester as texturizing ingredient. Refer for example to Diamond U.S. Pat. No. 2,619,422. A mixed partial fatty glyceride is used as stabilizer in the Diamond compositions.

SUMMARY OF THE INVENTION

The present compositions are fat-free or low fat frozen desserts having exceptional qualities of texture, mouth feel, stability, and flavor. In these respects the products resemble high fat frozen desserts such as ice cream, but in fact they have a low fat content corresponding to that of ice milk or sherbert, and preferred embodiments which are virtually indistinguishable from ice cream contain no triglyceride fat ingredient. The hard frozen desserts of this invention preferably have less than 65 percent of the calories of ice cream containing 10 percent fat and, of course, an even smaller fraction of the calories of rich ice creams which contain 16 percent fat. They generally provide from about 90 to about 155 Calories of food energy per serving weighing 100 g. Shakes typically supply about 100 Calories/100 g., and hard ice creams about 112 Calories/100 g.

The present frozen desserts have specific gravities similar to those of ice cream, ice milk, or an ice cream shake within the range of 0.45 to 0.73, and preferably 0.50 to 0.60. They preferably contain at least 6 percent milk solids and from 20 to 40 percent of total solids including the fat and milk solids and sugar when used as sweetening ingredient. Artifical sweeteners may be used. The frozen desserts contain 60 to 80 percent of water, all or a portion of which may conveniently be supplied as a dairy ingredient such as low fat skim milk, or concentrated skim milk. The products are preferably frozen while stirring to aerate or incorporate an inert gas to provide from 50 to 125 percent overrun in accordance with the usual practice in the ice cream making art. The most commonly used overrun is about 90 percent.

The key ingredient which confers the qualities of texture, stability, flavor, and mouth feel upon the products of the present invention which qualities have formerly been associated with the fat ingredient in frozen desserts, is a polyglycerol fatty ester present in an amount from 0.5 to 1.5 percent by weight of the finished product. The preferred polyglycerol ester for use in the present invention is triglycerol monostearate (Drewpol 3–1–S, Drew Chemical Company). The selection of an appropriate polyglycerol ester is based mainly on considerations of quality and purity as it effects flavor and wholesomeness rather than on a consideration of lypophil/hydrophil properties. Polyglycerol esters having a wide range of properties from highly lipophilic to highly hydrophilic are operable.

Frozen desserts of the present invention having highly desirable character with respect to texture, stability, etc. have been prepared using decaglycerol decastearate as texturizing ingredient which is a highly lipophilic polyglycerol ester. Entirely comparable results as to texture and stability have been prepared with triglycerol monostearate which is a relatively hydrophilic polyglycerol ester. Other specific polyglycerol esters that have been employed are hexaglycerol distearate and decaglycerol distearate.

Thus, the polyglycerol ester ingredient of the present composition may be broadly defined as one having from 3 to 10 glycerol units in the polyglycerol chain one or more of the hydroxyl groups of which are esterified. At least one is esterified. Since there are $(n + 2)$ hydroxyl groups in a polyglycerol chain in which "$n$" is the number of glycerol units, a fully esterified polyglycerol contains $(n + 2)$ fatty acyl groups. The entire spectrum of edible fatty acids having from 3 to 20 carbon atoms may be employed for esterifying groups. The preferred fatty acyl groups are those approved for food use and particularly those containing 8, 10, 12, 14, 16, 18, or 20 carbon atoms. When lower fatty acid groups are present, they are preferably present in amounts corresponding to their presence in natural oils or fats such as butter oil. Both the saturated and unsaturated fatty acyl groups are contemplated, but the saturated are preferred. To sum up, the present frozen desserts contain from 0.5 to 1.5 percent by weight of a polyglycerol fatty ester constituted of from 3 to 10 glycerol units and from 1 to $(n + 2)$ fatty acyl groups.

The preferred concentration of polyglycerol ester for the present frozen desserts is 0.8 percent by weight for a product containing about 30 percent total solids. This amount affords a highly desirable balance between stability, suspending, and texturizing properties and mouth feel. Products containing less than 0.5 percent by weight of polyglycerol ester are lacking in some or all of these characters particularly texture and stability. When amounts of polyglycerol ester exceeding 1.5 percent by weight are employed, a rather oleageneous mouth feel is imparted which is undesirable for imitation ice cream or ice milk. Generally those products containing lesser amounts of total solids of about 20–25 percent require larger amounts of polyglycerol ester, e.g. 1–1.5 percent. Conversely for higher amounts of solids of about 35–40 percent, a lesser amount of polyglycerol ester of about 0.5 percent is preferred.

The polyglycerol ester texturizing ingredient is believed to perform multiple functions including the following.

1. It assists in maintaining a uniform suspension of water insoluble ingredients in liquid mixes which may be aerated and frozen as in ice cream manufacture.
2. It prevents water separation when the frozen dessert melts. A homogenous liquid melt is characteristic of ice creams and ice milks, and accordingly such is desired for the frozen desserts of the present invention.
3. It reduces ice crystallization on storage of the frozen dessert. This problem is particularly aggravated with low fat products.
4. It confers a mouth feel on the frozen dessert similar to that of ice cream, and in this respect is believed to serve as a fat substitute on the basis of about one part by weight polyglycerol ester per 10 to 20 parts by weight of fat.

Another ingredient, which contributes significantly to the quality of the product is a hydrophilic colloid or gum as stabilizer. Such ingredient is especially desirable for the hard ice creams which may be stored for considerable periods prior to consumption. For shakes or soft ice creams which are usually consumed immediately after freezing such ingredient is not needed, although, small amounts are useful for maintaining a uniform liquid mix prior to freezing.

The hydrophilic colloid ingredient is used in an amount ranging from 0 percent up to 0.5 percent by weight of the finished product. For imitation hard ice creams the stabilizer seems to serve the function of delaying or preventing undesired crystallization of ice or sugars, etc. For these products the amount of stabilizer is preferably from about 0.2 to 0.5 percent by weight. Higher amounts are not recommended because of so-called "melt resistance." For ice cream, a liquid melt is desired and excess stabilizer prevents this with formation of a stiff, pudding-like melt. Amounts less than 0.2 percent are not sufficiently effective for prolonged storage of hard frozen products. For soft ice creams and shakes which are consumed immediately after freezing from 0.05 percent to 0.2 percent of stabilizer is preferred to maintain the liquid mix in smooth suspension prior to freezing, but satisfactory products for immediate consumption after freezing can be prepared containing no hydrophilic colloid stabilizer.

Suitable hydrophilic colloids include the vegetable gums such as acacia gum, xanthan gum, or other well known gums such as locust bean gum and carrageenan. Other hydrophilic colloids that are suitable are water soluble proteins such as gelatin, and water dispersible polysaccharides such as dextran, pectin, carboxymethylcellulose, starch (preferably pregelatinized), etc. The simple disaccharides or trisaccharides such as sucrose which form true solutions are not considered hydrophilic colloids for present purposes. A more complete list of suitable hydrophilic colloids is published in "Handbook of Food Additives," Chemical Rubber Publishing Company, Cleveland, Ohio, 1968, page 315.

Milk solids are, of course, a required ingredient according to various state regulations for a product to be labeled ice cream or ice milk. This ingredient and other food solids present in the product serve as bodying ingredients and contribute to the texture and mouth feel of the finished product. From 20 to 40 percent by weight of the finished product is made up of edible solids including the milk solids (6 to 20 percent) and fat (0 to 7 percent). Other bodying ingredients which may be included in the 20 to 40 percent total edible solids of the present compositions include sugar which, of course, can also serve as sweetener. It is possible to omit sugar entirely and use artificial sweeteners or to employ a reduced amount where a further reduction in calories is desired. An inert bodying material such as dextran, inulin, or microcrystalline cellulose may be substituted for sugar when artifical sweeteners are employed. For a chocolate frozen dessert, cocoa may be employed both as a flavoring agent and as bodying ingredient. Other suitable bodying ingredients include fructose, dried egg white, and starch. Bulky characterizing ingredients such as cut or chopped fruit or nuts may be employed. Non-nutritive bodying ingredients are not employed when the total food solids content reaches 40 percent by weight.

In some embodiments of the present invention, the milk solids are replaced by an equivalent amount on a weight basis of another protein ingredient such as sodium caseinate, potassium caseinate, calcium caseinate, vegetable proteins such as soybean protein isolate, soybean protein concentrate, fish flour, and vegetable flours such as peanut flour, sunflower seed flour, or soybean flour. When using protein substitutes of this sort which contain a higher percentage of protein than dry skim milk, and reduced bulk, it is usually desirable to supplement them with an additional bodying ingredient of the type referred to above. Ordinarily carbohydrates are selected for this purpose such as starch, sugar, or lactose but non-nutritive materials may also be used.

Up to 7 percent by weight of fat, preferably milk fat due to its high palatability, may be employed in the products of the present invention when preparing an ice milk. Ice milks contain 2 to 7 percent by weight of fat, at least 11 percent milk solids and at least 28 percent total solids. The most preferred embodiments of the present invention, however, are essentially fat free. By this is meant that no triglyceride fat ingredient as such is employed. Small amounts of fat may, however, be inherently included because of its presence in certain of the other ingredients. For example, when cocoa is used as a flavoring and bodying ingredient, a small amount of fat is inherently present because it is contained in the cocoa. The same applies to some of the protein ingredients referred to above as substitutes for milk solids. Soybean flour for instance may contain up to 20 percent by weight of fat. In any event, the fat content does not exceed 7 percent by weight of the finished product. The preferred low calorie imitation ice creams of the present invention contain less than 2 percent fat and the most preferred contain no triglyceride ingredient at all.

Liquid mixes which may be frozen with aeration to provide the present frozen desserts are also considered part of this present invention. They have precisely the same composition on a weight basis as the finished product. The criterion of the final products which is not applicable to the liquid mixes is that of specific gravity. They generally have a specific gravity of the order of 1.05 to 1.2 while the frozen products have specific gravities of 0.45 to 0.73 due to aeration while freezing. Aeration while freezing is preferably accomplished by stirring, but aerosol or other mechanical devices to cause the dispersion of an inert gas such as nitrogen or a fluorinated hydrocarbon may be used.

A convenient means of preparing and distributing the present frozen desserts is to incorporate the principal ingredients into a dry pre-mix which is used by the dairy to prepare the foregoing liquid mix prior to freezing. The dry pre-mix should contain the polyglycerol fatty ester texturizing ingredient, the hydrophilic colloid stabilizer if one is used, and desirably some or all of the flavoring and sweetening ingredients. In its essentials this is what the dry pre-mix is constituted of. For example, a dry mix for preparation of 100 parts by weight of a liquid mix should contain from 0.5 to 1.5 parts by weight of the edible polyglycerol fatty ester texturizing ingredient, from 0.05 to 0.5 parts by weight of a hydrophilic colloid stabilizer as described above, and flavoring and sweetening ingredients. It is preferred, however, to include other food solid ingredients with the foregoing ingredients as a carrier therefore. For this purpose, from 17.5 to 38 parts by weight of food solids or non-nutritive bodying ingredients of the types referred to above may be employed. Dry mixes to which it is only necessary to add water, aerate, and freeze have been prepared.

DESCRIPTION OF THE PREFERRED EMBODIMENTS

For preparation of the dry pre-mix which is constituted with liquid ingredients to provide the liquid mix which is frozen with aeration to yield the frozen dessert of this invention, a granulate polyglycerol ester is desirable since dry blending with other dry ingredients is a convenient first step. Suitable polyglycerol esters processed into granulate form are commercially available. The polyglycerol esters are inherently wax-like solids which are rather inconvenient to handle. Spray-cooling of the molten polyglycerol ester either in the pure state or with preservatives or carriers is one method used to provide granulate forms. The wax-like form of polyglycerol ester may be used to prepare the present frozen desserts if first melted with water or other aqueous ingredient. Hydration of the ester appears to take place under this treatment in the temperature range of 125°–135° F. which facilitates incorporation thereof into the liquid mix. This is illustrated by Examples 1 and 2.

EXAMPLE 1. IMITATION ICE CREAM

Triglycerol monostearate (Durkreme 310), 8 grams is mixed with 8 grams of water and kept at 125°–135° F. overnight. This and the following ingredients are then mixed with sufficient water to provide a kilogram of mix.

| | |
|---|---:|
| Nonfat Milk Solids | 141.3 g. |
| Sugar | 157.3 g. |
| Guar Gum | 2.0 g. |
| Carageenan | 0.5 g. |
| Polysorbate 80 | 0.3 g. |
| Water | q.s. 1000.0 g. |

This mixture is then pasteurized at 165° F. for 20 seconds, the flavors and colors, 1.9 g., added and the mixture then passed through a homogenizer before loading into a commercial ice cream freezer. It is frozen to a soft paste consistency and then transferred to 5 oz. containers and frozen hard. The ice cream freezer was adjusted to provide for 85 percent overrun. The product contains 30 percent by weight total solids including 14 percent milk solids, 0.8 percent polyglycerol ester, 0.3 percent hydrophilic colloid stabilizer, and substantially no fat.

EXAMPLE 2. IMITATION SOFT ICE CREAM

Triglycerol monostearate (Durkreme 310), 8 grams is mixed with 8 grams of water and kept at 125°–135° F. overnight. This and the following ingredients are then mixed with sufficient water to provide a kilogram of mix.

| | |
|---|---:|
| Nonfat Milk Solids from Concentrated Skim Milk | 184.9 g. |
| Sugar | 184.9 g. |
| Guar Gum | 2.0 g. |
| Carageenan | 1.0 g. |
| Polysorbate 80 | 0.4 g. |
| Water | q.s. 1000.0 g. |

This mixture is then pasteurized at 165° F. for 20 minutes flavors and colors having a total weight of 2.0 g. are added, the mixture homogenized and loaded into a commercial soft-serve ice cream freezer. The freezer is adjusted to provide a 75 percent overrun. The product contains 35 percent total solids, 16 percent milk solids non-fat, 0.8 percent polyglycerol ester, 0.3 percent stabilizer, and substantially no fat.

Vitamins and minerals may be incorporated into the frozen desserts, and premixes therefor as nutritional supplements. This is particularly desirable when a dietary product for use in a weight-loss program is prepared. This is illustrated in several of the following examples.

EXAMPLE 3. VANILLA FROZEN DESSERT, SHAKE TYPE

The following ingredients are mixed in the dry state in a cone type blender for 5 minutes.

| | |
|---|---|
| Fructose Powder | 200.0 g. |
| Carageenan | 38.0 g. |
| Sodium Saccharin | 7.5 g. |
| Ascorbic Acid | 5.1 g. |
| Color | 1.5 g. |
| Niacinamide | 0.2 g. |
| Calcium Pantothenate | 0.1 g. |
| Thiamine Hydrochloride | 0.05 g. |
| Pyridoxine Hydrochloride | 0.03 g. |
| Riboflavin | 0.02 g. |

The following are screened through an 8 mesh screen and added to the cone blender containing the above ingredients and mixing is continued for 20 minutes.

| | |
|---|---|
| Sucrose | 2652 g. |
| Triglycerol Monostearate Granulate | 609 g. |
| Fructose Powder | 503 g. |
| Potassium Citrate | 44 g. |

The foregoing dry blend pre-mix is then used to prepare a liquid mix as follows:
491 g. thereof is mixed in a tank with the following:

| | |
|---|---|
| Nonfat Milk Solids from Concentrated Skim Milk | 1535 g. |
| sucrose | 443 g. |
| Vanilla Flavor | 2.7 g. |
| Water, q.s. | 9213 g. |

This product is pasteurized by heating at 165° F. for 20 minutes. It is then packaged and shipped to ice cream stores to employ as feed for milk shake freezer-dispenser. When frozen and dispensed at 93.5 percent overrun, the product has a specific gravity of 0.57. It contains 17 percent by weight milk solids non-fat, less than 1 percent fat, and 27 percent total solids. The carageenan serves as stabilizer, 0.05 percent by weight, but may be omitted.

EXAMPLE 4. FAT FREE IMITATION VANILLA ICE CREAM

A dry blend pre-mix is prepared from the following ingredients by thorough blending thereof in a cone type blender.

| | |
|---|---|
| Fructose Powder | 493.0 g. |
| Triglycerol Monostearate Granulate | 251.0 g. |
| Potassium Citrate | 164.0 g. |
| Guar Gum | 62.8 g. |
| Carageenan | 15.7 g. |
| Polysorbate 80 | 9.4 g. |
| Ascorbic Acid | 3.0 g. |
| Color | 0.74 g. |
| Niacinamide | 0.14 g. |
| Calcium Pantothenate | 0.10 g. |
| Pyridoxine Hydrochloride | 0.02 g. |
| Riboflavin | 0.01 g. |
| Thiamin Hydrochloride | 0.01 g. |

The foregoing dry blend pre-mix is then constituted to a liquid mix by the local dairy or housewife in proportionally larger or smaller scale as desired according to the following recipe.

| | |
|---|---|
| Non-fat Milk Solids from Concentrated Skim Milk | 141.3 g. |
| Sucrose | 141.3 g. |
| Dry Blend Pre-mix | 31.8 g. |
| Vanilla Flavor | 0.63 g. |
| Water, q.s. | 1000.0 g. |

The foregoing liquid mix is then charged to an ice cream freezer and frozen with stirring at 102 percent overrun. Each five fluid ounce serving (80 g.) provides 0.1 g. of fat, 4.3 g. of protein, and 18.2 g. of carbohydrate, and 96 calories of food energy. It has a specific gravity of 0.55, and contains 0.8 percent polyglycerol ester, 0.2 percent carrageenan and guar gum, 14 percent milk solids, and 31 percent total solids, all expressed by weight.

EXAMPLE 5. VANILLA SOFT SERVE IMITATION ICE CREAM

A dry blend premix is prepared from the following ingredients by thorough blending thereof in a cone type blender.

| | |
|---|---|
| Sucrose | 583.68 g. |
| Triglycerol Monostearate Granulate | 281.37 g. |
| Guar Gum | 93.79 g. |
| Fructose Powder | 17.31 g. |
| Potassium Citrate | 10.89 g. |
| Carrageenan | 9.37 g. |
| Sodium Saccharin | 2.06 g. |
| Ascorbic Acid | 1.25 g. |
| Color | 0.36 g. |
| Niacinamide | 0.05 g. |
| Calcium Pantothenate | 0.04 g. |
| Thiamine Hydrochloride | 0.01 g. |
| Pyridoxine Hydrochloride | 0.01 g. |
| Riboflavin | 0.01 g. |

The dry blend premix is used to prepare a liquid mix as follows:

| | |
|---|---|
| Nonfat Milk Solids from Concentrated Skim Milk | 70.00 g. |
| Dry Blend Premix | 53.31 g. |
| Sucrose | 76.69 g. |
| Vanilla Flavor | 0.30 g. |
| Water, q.s. | 1000.00 g. |

The mixture is pasteurized at 165° F. for 20 minutes, homogenized and put into a soft-serve ice cream freezer. The freezer when set to dispense the product at 50 percent overrun provides a product having specific gravity 0.73. It contains 20 percent solids including 7 percent milk solids, 1.5 percent polyglycerol ester as texturizing ingredient, and 0.5 percent of a combination of carrageenan and guar gum as stabilizers.

EXAMPLE 6. VANILLA SOFT SERVE IMITATION ICE CREAM FORTIFIED WITH SODIUM CASEINATE OR CALCIUM CASEINATE

The composition of Example 5 is modified by the use of 67.2 grams of non-fat milk solids from concentrated skim milk rather than the amount specified there and 2.8 grams of sodium caseinate. Calcium caseinate may be used instead of sodium caseinate. The resulting product is somewhat smoother in texture than the product of Example 5 and contains more protein.

EXAMPLE 7. VANILLA SOFT SERVE IMITATION ICE CREAM CONTAINING SOY PROTEIN SUBSTITUTED FOR MILK PROTEIN

The composition of Example 5 is modified by use of 70 g. of soy proteinate containing approximately 81 percent protein for the milk solids specified in that example.

EXAMPLE 8. VANILLA SOFT SERVE IMITATION ICE CREAM CONTAINING SOYBEAN FLOUR AND SOY PROTEINATE

A composition is prepared as described in Example 5 except that 70 g. of defatted soybean flour is substituted for the non-fat milk solids. This is supplemented by 40 g. of soy proteinate containing 81 percent protein.

EXAMPLE 9. VANILLA ICE MILK

A dry blend premix is prepared from the following ingredients by thorough blending thereof in a cone type blender.

| | |
|---|---|
| Sugar | 865.25 g. |
| Triglycerol Monostearate Granulate | 93.79 g. |
| Fructose Powder | 17.31 g. |
| Potassium Citrate | 10.89 g. |
| Carrageenan | 9.37 g. |
| Sodium Saccharin | 1.66 g. |
| Color | 0.36 g. |

The dry blend premix is used to prepare a liquid mix as follows:

| | |
|---|---|
| Milk Solids from Concentrated Whole Milk | 180.00 g. |
| Cream—40% fat | 51.25 g. |
| Sucrose | 76.69 g. |
| Dry Blend Premix | 53.31 g. |
| Vanilla Flavor | 0.30 g. |
| Polysorbate 80 | 0.02 g. |
| Water, q.s. | 1000.00 g. |

The mixture is pasteurized at 165° F. for 20 minutes, homogenized and put into an ice cream freezer. The freezer is set for 80 percent overrun and yields a product containing 7 percent fat, and 0.5 percent polyglycerol ester. The polysorbate 80 is an emulsifier included to ensure thorough and stable emulsification of the fat.

EXAMPLE 10. CHOCOLATE IMITATION HARD TYPE ICE CREAM

A dry blend premix is prepared from the following ingredients by thorough blending thereof in a cone type blender.

| | |
|---|---|
| Sucrose | 743.21 g. |
| Triglycerol Monostearate Granulate | 150.00 g. |
| Fructose Powder | 38.25 g. |
| Guar Gum | 37.50 g. |
| Potassium Phosphate | 17.22 g. |
| Carrageenan | 9.38 g. |
| Ascorbic Acid | 2.12 g. |
| Ferrous Sulfate | 1.33 g. |
| Color | 0.34 g. |
| Vitamin A & D Powder | 0.28 g. |
| Niacinamide | 0.17 g. |
| Calcium Pantothenate | 0.10 g. |
| Pyridoxine Hydrochloride | 0.05 g. |
| Thiamine Hydrochloride | 0.04 g. |
| Riboflavin | 0.01 g. |

The dry blend premix is used to prepare a liquid mix as follows:

| | |
|---|---|
| Nonfat Milk Solids from Concentrated Skim Milk | 200.00 g. |
| Cream — 40% fat | 50.00 g. |
| Sucrose | 110.46 g. |
| Dry Blend Premix | 49.54 g. |
| Cocoa | 40.00 g. |
| Vanilla Flavoring | 0.20 g. |
| Water, q.s. | 1000.00 g. |

The liquid mix is frozen with an ice cream freezer that is designed to give a 125 percent overrun, and a product having a specific gravity of 0.48. It contains 20 percent by weight milk solids, 40 percent total solids, and 2 percent by weight fat.

What is claimed is:

1. A frozen dessert having a specific gravity of from 0.45 to 0.73 and comprised of
   a. from 0 to 7 percent fats,
   b. at least 6 percent milk solids,
   c. from 20 to 40 percent total solids,
   d. from 60 to 80 percent water supplied as such or as a dairy ingredient,
   e. from 0.5 to 1.5 percent of an edible polyglycerol fatty ester texturizing ingredient constituted of from 3 to 10 glycerol units and from 1 to $(n + 2)$ edible fatty acyl groups having from 3 to 20 carbon atoms each wherein $n$ is the number of said glycerol units,
   f. from 0.05 to 0.5 percent of a hydrophilic colloid stabilizer, and
   g. sufficient sweetening and flavoring ingredients to provide a desirable flavor, each of said percentage values expressing percent by weight of said dessert.

2. The frozen dessert of claim 1 having (a) more than 2 percent but not more than 7 percent fat; (b) at least 11 percent milk solids; and (c) at least 28 percent of total solids.

3. The frozen dessert of claim 1 wherein said fat is milk fat.

4. The frozen dessert of claim 1 having not more than 2 percent fat.

5. The frozen dessert of claim 1 having less than 0.2 percent of hydrophilic colloid stabilizer.

6. The frozen dessert of claim 1 having from about 0.2 to 0.5 percent of hydrophilic colloid stabilizer.

7. The frozen dessert of claim 1 having approximately 0.8 percent of polyglycerol ester texturizing ingredient.

8. The frozen dessert of claim 1 wherein all or a portion of said milk solids is substituted on a protein equivalent weight basis by a protein ingredient selected from the group consisting of casein or an alkali or an alkaline earth metal salt thereof, vegetable protein, fish flour, and vegetable flour.

9. The frozen dessert of claim 1 prepared by freezing a liquid mix containing all ingredients while stirring.

10. A liquid mix adapted for freezing with aeration to provide the frozen dessert of claim 1 comprising a homogeneous aqueous suspension containing
   a. from 0 to 7 percent fat,
   b. at least 6 percent milk solids,
   c. bodying ingredients selected from the group consisting of sucrose, dextran, inulin, microcrystalline cellulose, cocoa, fructose, dried egg white, and starch sufficient to provide a total of from 20 to 40 percent solids,
   d. from 60 to 80 percent water supplied as such or as a dairy ingredient,
   e. from 0.5 to 1.5 percent of an edible polyglycerol fatty ester texturizing ingredient constituted of from 3 to 10 glycerol units and from 1 to $(n + 2)$ edible fatty acyl groups having from 3 to 20 carbon atoms each wherein $n$ is the number of said glycerol units,
   f. from 0.05 to 0.5 percent of a hydrophilic colloid stabilizer, and
   g. sufficient sweetening and flavoring ingredients to provide a desirable flavor, each of said percentage values expressing percent by weight of said mix.

11. The liquid mix of claim 10 wherein all or a portion of said milk solids is substituted on a protein equivalent weight basis by a protein ingredient selected from the group consisting of casein or an alkali or an alkaline earth metal salt thereof, vegetable protein, fish flour, and vegetable flour.

12. A dry pulverulent premix adapted for preparation of the liquid mix of claim 10 comprising the following ingredients (a), (b), and (c):
   a. 0.5 to 1.5 parts by weight of an edible polyglycerol fatty ester texturizing ingredient constituted of from 3 to 10 glycerol units and from 1 to $(n + 2)$ edible fatty acyl groups having from 3 to 20 carbon atoms each, wherein $n$ is the number of said glycerol units;
   b. from 0.05 to 0.5 parts by weight of a hydrophilic colloid stabilizer; and
   c. up to 33 parts by weight of flavors, sweeteners, and bodying ingredients selected from the group consisting of sucrose, dextran, inulin, microcrystalline cellulose, cocoa, fructose, dried egg white, and starch;
   which, on constitution with the following ingredients (d), (e), (f), and (g), provides 100 parts by weight of said liquid mix:
   d. from 6–20 parts by weight of nonfat milk solids;
   e. from 0 to 7 parts by weight of fat;
   f. from 60 to 80 parts by weight of water; and
   g. additional bodying ingredients selected from the group consisting of sucrose, dextran, inulin, microcrystalline cellulose, cocoa, fructose, dried egg white, and starch in an amount sufficient to provide a total of 20–40 parts by weight of non-aqueous ingredients.

* * * * *